Feb. 2, 1943.  W. K. YOUNGBERG  2,309,814
BUTTER CUTTER
Filed Jan. 18, 1940
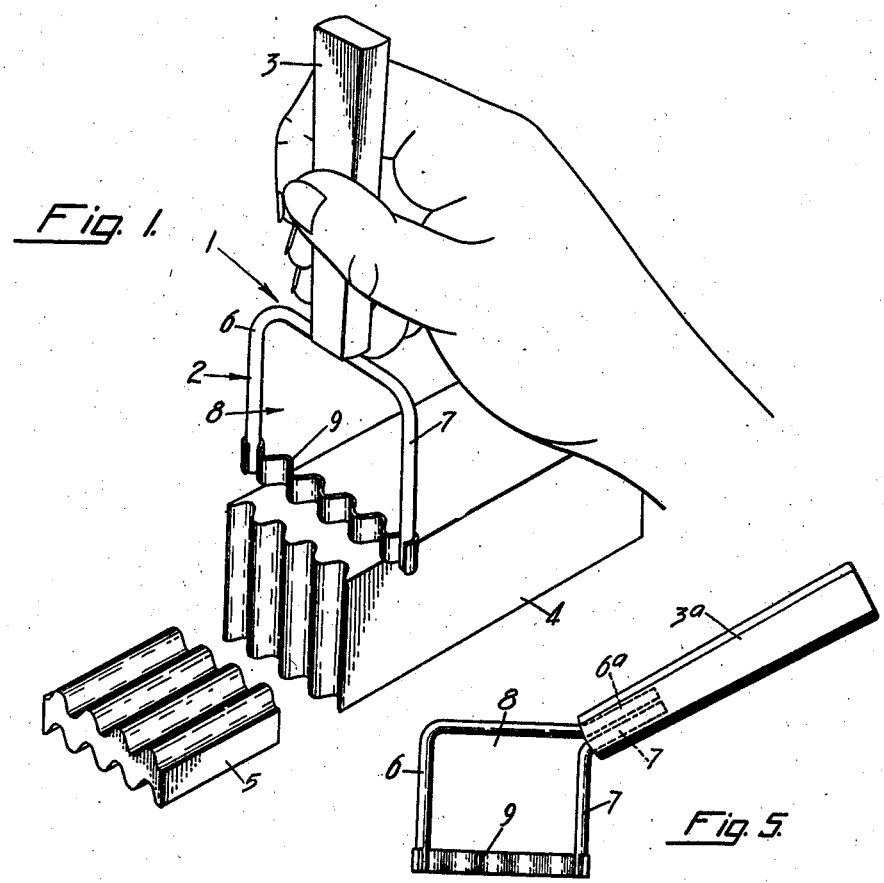
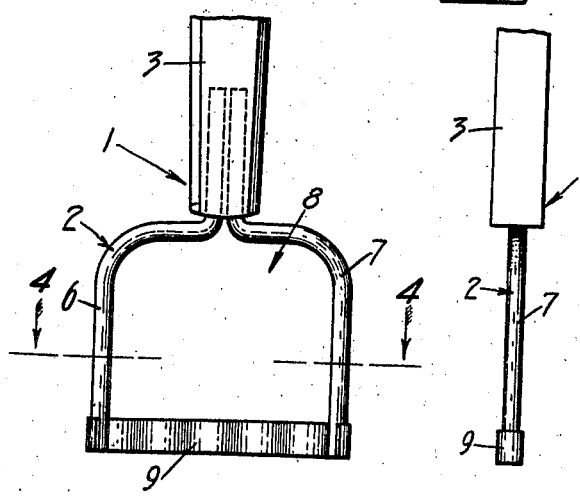
INVENTOR
Walter K. Youngberg
By
ATTORNEY Patented Feb. 2, 1943

2,309,814

UNITED STATES PATENT OFFICE 2,309,814

BUTTER CUTTER

Walter K. Youngberg, Middletown, Conn.

Application January 18, 1940, Serial No. 314,483

2 Claims. (Cl. 30—115)

My invention relates to butter cutters.

It has among its objects to provide an improved butter cutter especially adapted to use in connection with cutting butter chips from standard quarter pound bars. A further object of my invention is to provide such a device adapted to enable such chips to be very readily and quickly and conveniently formed while maintaining the same in the desired shape and effectively separating the same from the bar, and while also maintaining the bar unmarred and the operator's hands wholly out of contact with the butter. A further object of my invention is to provide such an improved device especially adapted while obtaining the above results, also to produce specially formed or ornamental chips of attractive appearance.

In the accompanying drawing, I have shown for purposes of illustration, certain embodiments which my invention may assume in practice.

In this drawing:

Figure 1 is a perspective view of my improved construction in use on such a butter bar;

Fig. 2 is a front elevation of the butter cutter structure, a portion of the handle being broken away to facilitate illustration;

Fig. 3 is a side elevation of the structure shown in Figure 2;

Fig. 4 is a detailed sectional view on line 4—4 of Figure 2, and

Fig. 5 is a view generally similar to Figure 2, but showing a modified construction.

Referring first to Figures 1 to 4, it will be noted that I have shown therein an improved butter cutter, generally indicated at 1, and having a generally U-shaped frame 2 and a handle 3 projecting away therefrom; this device being adapted to be used, as shown in Figure 1, on a standard quarter pound bar 4 in such manner as successively to cut off and form improved ornamental butter chips of the construction shown at 5.

Referring more particularly to the construction of the device 1, it will be observed that herein the frame 2 thereof comprises like side and top members 6 and 7 having straight vertical side portions bent together at the top and then upwardly in closely adjacent parallel relation as illustrated and herein inserted and suitably attached in an elongated upwardly extending handle 3, herein centrally disposed with respect to the top of the frame 2. As illustrated, the side portions of the members 6 and 7 are of equal length and extend down in such manner as to form abutments on a suitable flat support. Further, it will be observed that a transverse opening 8 is provided through this frame 2, which is of such dimensions as to be adapted to receive the bar 4 even when the lower extremities of the members 6 and 7 engage the support and thus eliminate marring of the buttter bar by contact with either the sides or top of the frame. Further, it will be observed that a transversely disposed cutter element, herein in the form of a band 9 is suitably permanently connected to the bottom extremities of the members 6 and 7. While this member 9 may assume various forms, it is herein in the form of a narrow convoluted or fluted band adapted to produce a corresponding form on the butter chip 5 as the latter is cut off from the bar 4, and also having its lower edge disposed parallel to the support. Further, it will be observed that the metal of which this band 9 is formed is of such thickness as effectually to separate the chip 5 from the bar and eliminate any tendency of the chip and bar to adhere above the cutter. Also, the minimum height, or depth, of the band 9 is such as to facilitate cutting and minimize the tendency of butter to adhere thereto while also enabling cleanly cut edges, as distinguished from broken edges, to be obtained without requiring any cutting edge. This narrow band further makes it possible to leave an opening 8 above the band of sufficient height to clear the top of the bar 4, while at the same time providing effective means for separating the chip from the bar following cutting off.

In the use of my improved construction, the device 1 is preferably first placed in warm or cold water depending upon whether the butter is too hard or too soft. Then the device is used to cut the butter chips 5 successively from the bar 4, as shown in Figure 1. More particularly, the device 1 is vertically disposed while the handle 3 thereof is grasped in the hand as shown in that figure, and then device 1 is moved downwardly to cut the chip. It will also be observed that, due to the shape of the opening 8, neither the top nor the side surfaces of this bar are mutilated during cutting, while, due to the provision of the handle 3 which projects away from the frame 2, it is made possible for the operator to grip the handle very securely and yet readily locate the latter with the desired accuracy without requiring any contact of the hand with the bar 4. Further, following cutting, due to the clearance between the frame and the bar, it will be observed that the band 9 is very readily and conveniently movable to separate the chip from the bar by merely moving the frame longitudinally of the bar or about the bottom of the band as a pivot, while, due to the narrow band provided, utilizing this to effect separation of the chip, without marring either the bar or chip while minimizing cleavage of the butter to the band.

In Figure 5, I have shown a modified construction wherein the handle 3 is disposed at a different angle with respect to the opening 8, and the frame members 6 and 7 are of different construction; the member 6 therein extending clear across the opening, and both members being provided with angularly disposed extensions 6a, 7a, which are disposed in and connected to an angularly disposed handle member 3a.

As a result of my improved construction, it is made possible to produce exceedingly dainty and attractive butter chips by a very simple cutting operation and while maintaining the shape of the bar, and all parts of the cutting device, other than the cutting band, out of contact with either the chip or the bar. Further, the chips may be formed as thin or thick as desired with parallel flutes on both sides by successive operations as indicated in Figure 1. If desired, they also may be formed with perpendicularly disposed flutes on opposite sides thereof by merely turning the square bar 4 through a quarter turn after each cutting operation, such cutting also permitting even thinner chips to be produced. Moreover, it will be observed that the operator's hand need not come in contact any time with the bar or chip. The structure is also adapted to be inexpensively produced, while being of an attractive appearance. These and other advantages of my improvements will, however, be apparent to those skilled in the art.

While I have herein specifically described certain forms which my invention may assume in practice, it will be understood that these forms have been shown for purposes of illustration.

What I claim as new and desire to secure by Letters Patent is:

1. A butter cutter for cutting butter chips for individual table use from a standard butter bar of like cross section including a rectangular frame having a rectangular opening therethrough of substantially the cross sectional dimensions of such a bar and into which the latter is adapted to enter during a vertical cutting operation, and also having side and top portions on said frame closely conforming to the sides and top of such a bar upon the completion of the cutting operation and said sides extending into adjacency to an underlying butter bar support, a narrow transversely disposed combined cutter and chip separating band member having a substantial height and a height constituting only a small fraction of the height of said rectangular opening and engageable throughout its length with said underlying support and connected at its ends to the extremities of said sides and movable vertically through said bar, the area enclosed by said frame being free from obstruction above said band member, and finger grasping means carried by and projecting away from said frame for disposing the fingers out of contact with the butter bar and the top portion of said frame during the cutting operation.

2. A butter cutter according to claim 1 wherein said cutter member comprises a shallow sinuous band rigidly connected to said sides and adapted to cut the butter bar to form decorative chips and providing an abutment laterally movable to separate the chip and engaging only a shallow zone on the cut chip closely adjacent the bottom thereof upon completion of cutting for minimizing cleavage of said chip to said band following cutting.

WALTER K. YOUNGBERG.